Aug. 6, 1968  W. J. CLABAUGH  3,395,647
JET PUMP
Filed Nov. 21, 1966  2 Sheets-Sheet 1
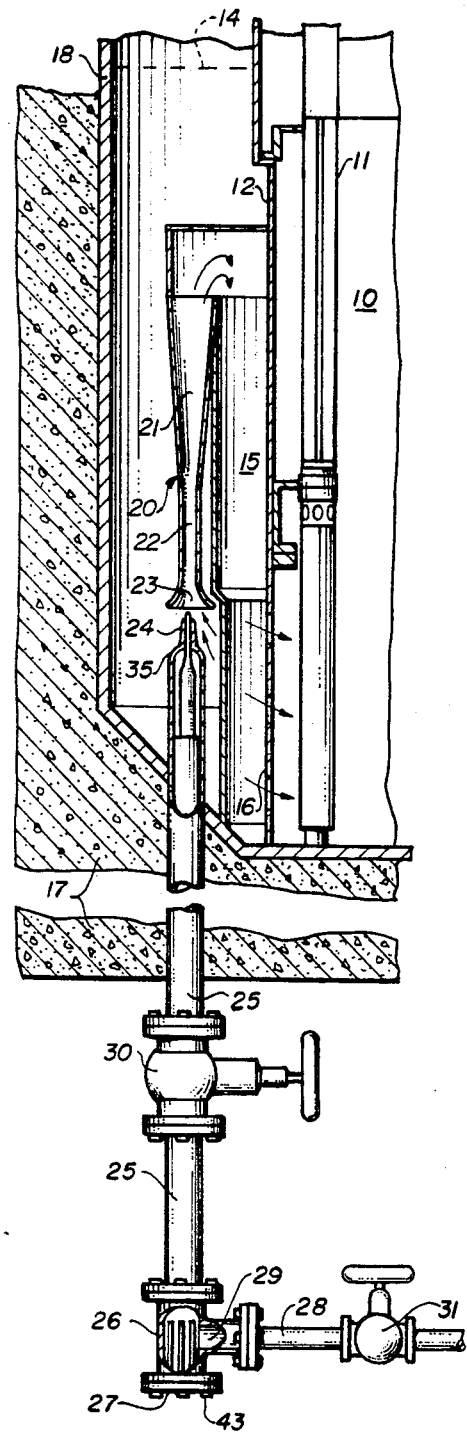
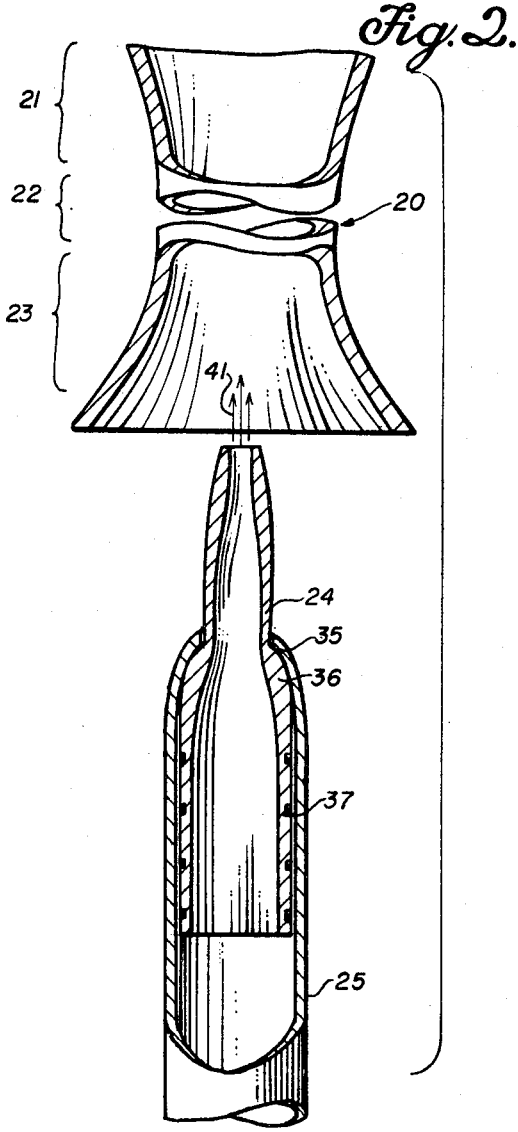
INVENTOR.
WILLIAM J. CLABAUGH
BY
ATTORNEY

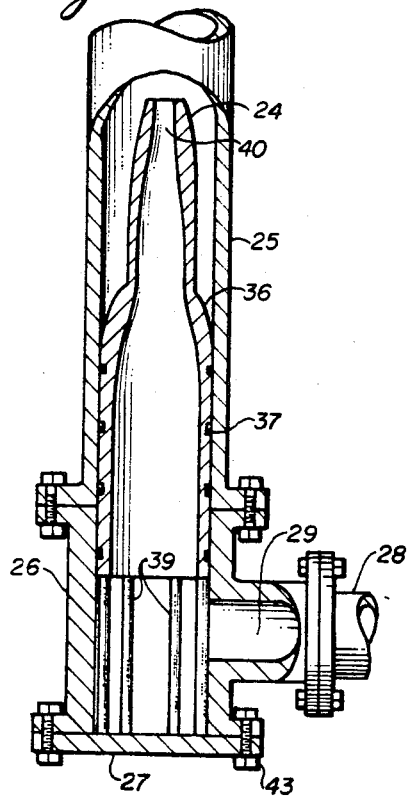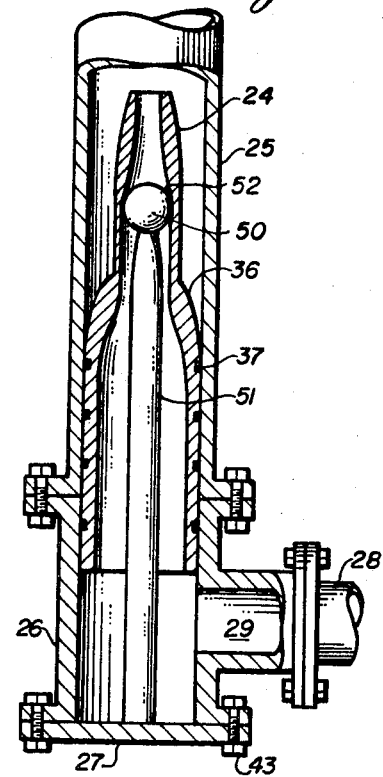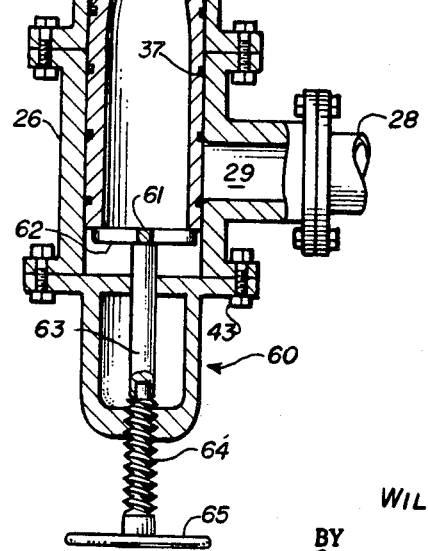

United States Patent Office 3,395,647
Patented Aug. 6, 1968

3,395,647
JET PUMP
William J. Clabaugh, Los Gatos, Calif., assignor to the United States of America as represented by the United States Atomic Energy Commission
Filed Nov. 21, 1966, Ser. No. 596,014
4 Claims. (Cl. 103—278)

ABSTRACT OF THE DISCLOSURE

A jet pump having a readily removable nozzle. The nozzle is slideable within an injection conduit and is held in operative position within said conduit by fluid pressure. The jet pump is further provided with check valve means to prevent fluid back flow through said nozzle and injection conduit.

---

The invention described herein was made in the course of, or under, Contract No. AT(04-3)-189, Project Agreement 46, with the Atomic Energy Commission.

This invention relates to pumps, and in particular to jet pumps using a rapidly flowing column of fluid to entrain and move a larger volume of fluid.

The invention herein relates to a jet pump for a nuclear reactor having a nozzle which slides into position within the reactor, using the jet fluid or feedwater pressure to slide it along inside a conduit from outside the reactor. Stopping the flow of jet fluid permits the valve to slide back out of the reactor to a section where it may be removed and replaced. The nozzle may be arranged to act as a plug or valve which prevents the backflow of fluid from the pressure vessel into the jet fluid or feedwater system.

In jet pumps which are remotely located and inaccessible, or to which access is difficult, such as in the core region of a nuclear reactor, the maintenance of the pump nozzle supplying the rapidly flowing column or fluid becomes a serious problem. At times, it becomes necessary to change jet nozzles to change the flow characteristics of the pump, or to replace worn-out nozzles during reactor operation. The clearances within thick-walled reactor vessels, etc., are generally limited so that the use of long or complicated mechanical retrieval devices such as grapples on extension arms for servicing pumps is usually not practical. In addition, at the generally high operating pressures within the reactor containment vessel, mechanical devices which are capable of retrieving the nozzle further require a complex sealing scheme to prevent any pressure loss during retrieval when the reactor is under pressure, or, in special cases, when there is no radiation hazard when the reactor is operative. The jet pump of this invention overcomes these problems by permitting retrieval and replacement of the jet nozzle during operation of the reactor by operators operating from areas away from dangerous radioactivity through the use of the pumping fluid as the actuating element and without the need for complicated accessory mechanical retrieval systems.

It is therefore an object of this invention to provide a jet pump having a jet nozzle which may be removed and replaced by an operator at a position removed from the pump itself.

It is another object of this invention to provide a jet pump for a nuclear reactor in which the jet nozzle may be removed and replaced while the reactor is under pressure.

It is a further object of this invention to provide a jet pump in which the force of the jet fluid is used to place and maintain in position the jet nozzle during operation of the pump.

It is another object of this invention to provide a jet pump having a fully retractable and free-floating jet nozzle.

It is a further object of this invention to provide a jet pump for a high pressure pumping system in which the jet nozzle automatically prevents backflow of fluid into the jet fluid or feedwater system.

Other and more particular objects of this invention will be manifest upon study of the following detailed description, when taken together with the accompanying drawing, in which:

FIGURE 1 is a partial section through a typical boiling water nuclear reactor showing the relationship of the pump, jet nozzle and retrieval area to the reactor core and containment vessel;

FIGURE 2 is a detail section through the upper portion of the jet pump of this invention, showing the jet nozzle in its normal operating position relative to the educator tube;

FIGURE 3 is a detail section through the lower portion of the jet pump of this invention, showing the nozzle in its normal position when the pump is not operating;

FIGURE 4 is a detail section through the lower portion of the jet pump of this invention, showing an arrangement method for preventing the backflow of fluid into the jet or feedwater fluid system; and FIGURE 5 is a detail section through the lower portion of the jet pump of this invention, showing another arrangement for preventing the backflow of fluid into the jet or feedwater system.

Referring to FIGURE 1, a jet pump of this invention is shown installed in a typical boiling water nuclear fission reactor. Such a reactor comprises basically a core region 10, containing a plurality of fuel elements 11 arranged in ordered array with control elements (not shown) common in the art, contained in a shroud or shell 12 which is surrounded by a pool of water 14 serving as a reservoir of coolant which will be converted to steam in the reactor. A plurality of jet pumps of this invention (of which only one is shown in this figure) are distributed peripherally about shroud 12 and inject or pump the coolant from pool 14 into plenum 15 concentric about shroud 12, through openings or ports 16 in the lower portion of shroud 12. The coolant then passes up through core region 10, through fuel elements 11, where it is converted into steam. This entire arrangement, constituting the steam generating portion of the reactor, is contained in a concrete shielded pressure vessel 17 having an impermeable liner 18 to prevent contact between the concrete and the coolant.

The jet pump used in this reactor arrangement performs two functions: (1) it forces coolant into the reactor core where it is converted into steam; and (2) it supplies feed water to replace the water converted to steam and removed from the system.

Still referring to FIGURE 1, and more particularly to the jet pump of this invention, the present device comprises basically an eductor tube 20, having a flaring outlet portion 21, a constricted throat section 22, and a tapered inlet portion 23 into which is directed a nozzle 24 which is fitted in sliding relation within a generally straight conduit 25 extending downwardly through concrete pressure vessel 17 to a non-hazardous equipment area below the reactor. Conduit 25 terminates at the lower end in a T fittinb 26 having a removable flange 27 over the opening in line with conduit 25, and which is connected to feedwater supply conduit 28 at side inlet 29, perpendicular to conduit 25. A smooth bore ball or gate valve 30 is provided in conduit 25 between vessel 17 and fitting 26 to prevent the backflow of coolant from pool 14 into the feedwater or jet fluid supply system when nozzle 24 is being replaced. A second valve 31 is provided in feedwater supply conduit 28 to close off 28 from fitting 26 and to facilitate removal of the nozzle without loss of feedwater when flange 27 is removed.

FIGURE 2 illustrates the pumping portion of the jet pump of this invention, enlarged from FIGURE 1, located within the reactor, showing nozzle 24 in its normal operating position. Nozzle 24, for the purposes of the present invention, comprises a generally cylindrical tubular body having a lower exterior portion fitting in sliding guided relation in conduit 25 and an upper tapering tip portion separated from the lower portion by a shoulder portion 36. Generally speaking, an axial bore extends from the base to an axial opening in the tip of the nozzle 24 body, which bore is generally larger at the base and tapers inwardly toward the tip opening. The upper opening of conduit 25 is terminated in a necked-down seat portion or stop 35 against the inside of which shoulder 36 of nozzle 24 seats to prevent its travel beyond the end of conduit 25, and with the tapering tip portion directed axially through inlet portion 23 of eductor 20. Stop 35 establishes the position of nozzle 24 and its alignment relative to throat section 22 of eductor tube 20. A plurality of circumferential compliant seal rings 37 are provided along the lower outside cylindrical surface of nozzle 24 which are fitted into grooves in nozzle 24 and slide along the smooth bore inside surface of conduit 25. Seal rings 37 are arranged to prevent or minimize the flow of feedwater, i.e., jet fluid, through conduit 25 from passing around nozzle 24, yet not prevent the free sliding action of nozzle 24 inside conduits 25.

FIGURE 3 illustrates one embodiment of the lower portion of the jet pump of this invention, showing the arrangement for supporting and removing nozzle 24 when no feedwater flows in conduits 25 and 28. In this embodiment, a plurality of stop rods 39 projecting upwardly from flange plate 27 are provided upon which nozzle 24 is supported along its bottom periphery.

To operate the device of this invention, feedwater valve 31 (FIGURE 1) is opened, permitting the flow of feedwater into T fitting 26 from feedwater conduit 28. The feedwater then passes up through the central bore of nozzle 24 (FIGURE 3). Since the central bore of nozzle 24 varies in internal diameter along its length, ending in a constricted zone 40 proximate its upper tip end, a resistance to flow is created which results in a pressure difference across the nozzle. The consequence of this pressure difference is the moving of nozzle 24 up toward the upper end of conduit 25 where its travel is halted by necked-down portion or stop 35 (FIGURE 2). The feedwater continues to flow through nozzle 24 toward eductor throat section 22, as indicated by arrows 41 defining a jet or rapidly-flowing column of water. Coolant from the surrounding reservoir 14 is entrained in this rapidly-flowing column of fluid, i.e., jet, and pulled thereby into inlet 23 through throat section 22, and out through outlet 21 into plenum 15 (FIGURE 1); then through opening 16 into core region 10, where it is converted into steam.

When valve 31 (FIGURE 1) is closed, cutting off the flow of feedwater into conduit 25, the pressure difference across nozzle 24 disappears and, by virtue of its weight and the forces of gravity, nozzle 24 will slide down conduit 25 to T fitting 26. Alternatively, flow of jet fluid from conduit 28 can be reversed so that nozzle 24 is forced down conduit 25.

To remove nozzle 24 from the pump, flange 27 is removed by unfastening bolts 43 after first closing valves 30 and 31. It must be cautioned that valve 30 should be either a gate valve, rotating ball valve, or other type which has an unrestricted flow passage or bore of the same diameter as conduit 25 and in exact alignment therewith to permit the unimpeded passage of nozzle 24 up and down conduit 25.

FIGURE 4 illustrates another embodiment of the jet pump of this invention, wherein the flow of coolant from reservoir 14 into conduit 25, and thus into the feedwater or jet fluid system, is prevented should a break in the feedwater system or drop in feedwater pressure occur.

In this particular embodiment, a plug 50, shown here as a sphere, is disposed on the upper end of a support rod 51 affixed to flange 27. The central bore is preferably made with an enlarged cylindrical portion beginning at the base end of nozzle 24 and a constricted upper bore portion thereby defining therebetween a seat or shoulder 52 contoured to fit or rest in a sealed relation on plug or sphere 50.

As shown in FIGURE 4 with no jet fluid to force it upwardly, shoulder 52 of nozzle 24 will normally rest on sphere or plug 50 by virtue of its own weight. If valve 30 (FIGURE 1) remains open and reservoir 14 is under pressure (since conduit 25 opens into reservoir 14), fluid pressure will be exerted down the column of fluid in conduit 25 and against nozzle 24. The force of this pressure against nozzle 24 will tend to increase the pressure of seat 52 against plug 50, further increasing the sealing ability of plug 50. Flow of fluid around nozzle 24 is prevented or minimized by seal rings 37.

It must be noted that support rod 51 should preferably extend up conduit 25 as far as feasible to provide as short a path for the travel of nozzle 24 to the end of conduit 25 as possible. The shorter the path, the less distance nozzle 24 can accelerate and thus prevent possible damage to the necked-down portion or stop 35 (FIGURE 2).

Another embodiment of the jet pump of this invention which also prevents the backflow of coolant into the feedwater system is illustrated in FIGURE 5.

In this embodiment, the lower portion of the pump at T fitting 26 is the same as FIGURES 1–4, with the exception that flange 27 is replaced by screw lift assembly 60 which is arranged to lift nozzle 24 up and past side inlet 29 of T fitting 26, so that the jet fluid or feedwater will be able to flow into conduit 25 and propel nozzle 24 up to stop 35 (FIGURE 2). Still referring to FIGURE 5, lift assembly 60 comprises a spider support 61, having legs 62 extending outwardly a sufficient distance to permit the bottom peripheral edge of nozzle 24 to rest thereon. Spider 61 is raised and lowered by shaft 63, either engaged with or a part of helical screw 64, which in turn is attached to handle 65. Rotation of handle 65 will cause shaft 63 and spider 61 to move either upward or downward, raising or lowering nozzle 24 past inlet 29.

In operation, spider 61 is maintained in this lower position. When the supply of jet fluid or feedwater is cut off, as previously described, nozzle 24 will drop down conduit 25 and come to rest on spider support 61, as shown in FIGURE 5. It will be noted that nozzle 24 covers inlet 29 in the manner of a slide valve, thus preventing the flow of fluid in either direction, from conduit 25 into inlet 29, or from inlet 29 into conduit 25. Seal rings 37 prevent or minimize the bypass of fluid around nozzle 27. Thus the flow of fluid from reservoir 14 is automatically prevented from passing into the jet fluid or feedwater system.

To release nozzle 24, handle 25 of lift assembly 60 is turned to raise spider 61, which in turn raises nozzle 24 so that its bottom peripheral edge uncovers inlet 29 sufficiently so that the flow of feedwater into T fitting 26 and conduit 25 through nozzle 24 will be sufficient to begin to propel it up to stop 35 (FIGURE 2).

Nozzle 24 may be easily removed from conduit 25 through T fitting 26 merely by loosening bolts 43 and removing lift assembly 60.

Although the foregoing embodiment has been described in detail, there are obviously many other embodiments and variations in configuration which can be made by a person skilled in the art without departing from the spirit, scope or principle of this invention. Therefore, this invention is not to be limited except in accordance with the scope of the appended claims.

I claim:

1. A jet pump comprising; means defining an eductor tube having a tapered inlet end portion, a constricted throat section and a flared outlet portion; a generally straight injector conduit terminating at one end adjacent said inlet portion of said eductor tube and having an axial opening directed toward said throat section of said eductor tube, said injector conduit having removable sealed access assembly means proximate its other end including fluid inlet means thereat, and adapted at its said one end to receive and retain a nozzle in seated relation, said axial opening in the said one end of said injector conduit being smaller in cross-section than the cross-section of the said other end of said conduit; and nozzle means having different cross-sectional portions at different ends thereof, said nozzle means being provided with an axial bore having a cross-section at one end thereof smaller than the cross-section at the opposite end thereof, said axial bore further having two axially spaced constricted throat sections, said nozzle means fitting in sliding relation within said injector conduit, movable toward said throat section of said eductor tube to be positioned in said seated relation at said one end of said injector conduit by the flow of fluid through said injector conduit and through said nozzle means and slidable toward said removable sealed access assembly means upon the stopping of fluid flow for removal of said nozzle means from said other end of said injector conduit through said removable access assembly means when no fluid flows therein.

2. A pump of the jet type in accordance with claim 1, wherein said nozzle means comprises a generally cylindrical body composed of said different cross-sectional portions, one of said cross-sectional portions tapering to a nozzle tip at the said one end thereof and provided with said smaller cross-section axial bore therein, another of said cross-sectional portions defining a substantially uniform portion thereof and being provided with the larger cross-section axial bore therein; and plug means for preventing the flow of fluid back through said axial bore of said nozzle means and axial opening in said injector conduit into said fluid inlet means.

3. A pump of the jet type in accordance with claim 2, wherein said plug means comprises a longitudinal rod fixed relative to said injector conduit, extending longitudinally and coincident with the longitudinal axis of said conduit, said axial bore of said nozzle means having one of said constricted throat sections in the central portion thereof, and said plug means having a diameter greater than said one of said constricted throat sections of said nozzle means axial bore, and upon which said nozzle means is seated in a sealed relation, preventing the flow of fluid back into said injector conduit.

4. A pump of the fluid jet type in accordance with claim 2, wherein said plug means includes a movable support assembly mounted in said removable access assembly means which functions to support said opposite end of said nozzle means such that said nozzle means covers said fluid inlet means when no fluid flows in said injector conduit to prevent the flow of fluid from said fluid inlet means to said injector conduit.

References Cited
UNITED STATES PATENTS

| | | | |
|---|---|---|---|
| 2,391,734 | 12/1945 | Nittka | 103—271 X |
| 2,607,624 | 8/1952 | Lippert | 239—204 |
| 2,943,798 | 7/1960 | Rienks | 239—204 X |
| 3,117,724 | 1/1964 | Ray | 239—204 X |
| 3,166,020 | 1/1965 | Cook | 103—278 X |
| 3,307,787 | 3/1967 | Hall | 239—204 X |

FRED C. MATTERN, JR., *Primary Examiner.*

W. J. KRAUSS, *Assistant Examiner.*